Fig. I

INVENTORS
RALPH L. JENNER
SIMPSON BRENT MILLS
BY
THEIR ATTORNEY.

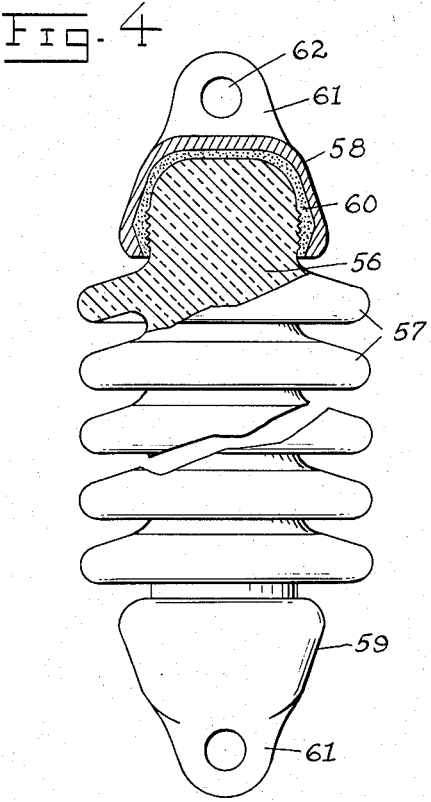
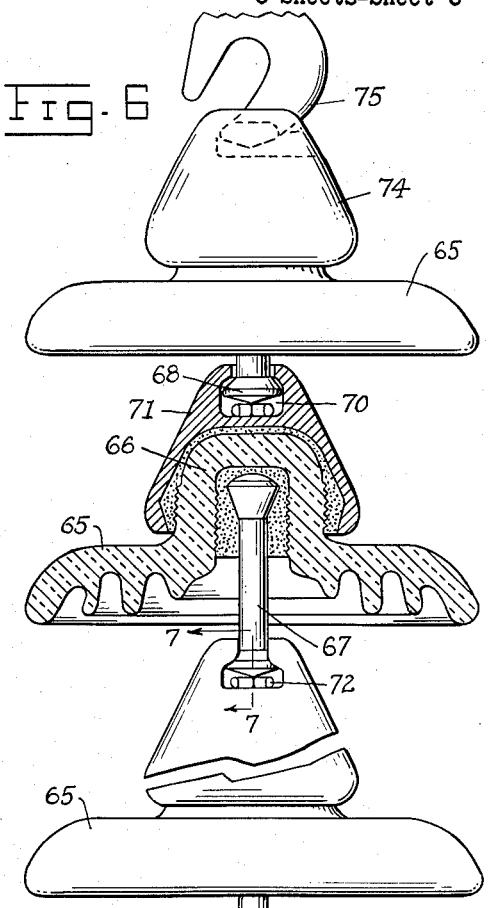
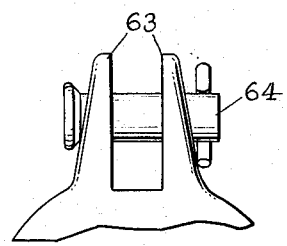
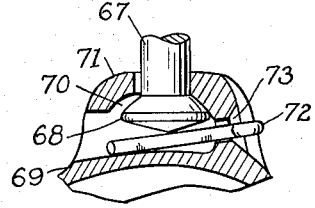
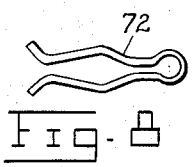
INVENTORS
RALPH L. JENNER
SIMPSON BRENT MILLS
BY
THEIR ATTORNEY.

United States Patent Office 3,002,043
Patented Sept. 26, 1961

3,002,043
ELECTRICAL TRANSMISSION SYSTEM
Ralph L. Jenner and Simpson Brent Mills, Le Roy, N.Y., assignors to Lapp Insulator Company, Inc., Le Roy, N.Y., a corporation of New York
Continuation of abandoned application Ser. No. 546,043, Nov. 10, 1955. This application Dec. 14, 1960, Ser. No. 76,440
8 Claims. (Cl. 174—40)

This invention relates to supporting and insulating means for high voltage electrical transmission systems, one object of the invention being to provide an improved system embodying more efficient and economical principles of construction.

Another object is to provide a system of this character having a type of construction which is safer against flashover interruption of the power line and more economical to maintain.

Another object is the provision of such a system by which existing installations may be readily and safely converted to transmit power more economically under higher voltages.

A further object is to supply an improved construction of such a nature that new systems may be erected with a "right-of-way" of less width and less cost than formerly required, particularly in thickly populated areas.

A further object is to provide a system of the character described so constructed as to permit the use of poles or towers with cross arm means of reduced length, to thereby increase their strength and resistance to the forces which may be applied under abnormal conditions such as result from broken conductors, weather conditions and the like, thus reducing the cost of construction and maintenance of the system and the liklihood of damage to it and adjacent property.

Still a further object is the supply of a system by means of which the above advantages are provided in a construction which is readily and economically manufactured, erected and maintained in operating condition.

To these and other ends the invention resides in certain improvements and combinations of parts, all as will be hereinafter more fully described, the novel features being pointed out in the claims at the end of the specification.

In the drawings:

FIG. 4 is an enlarged elevation partly in section and partly broken away showing a "strut" type insulating member employed in my invention;

FIG. 5 is a fragmentary elevation showing one of the pin and clevis attachment means for the ends of the insulating member of FIG. 4;

FIG. 6 is an elevation partly broken away and partly in section of a suspension type string of insulating elements which may be employed in my invention;

FIG. 7 is a fragmentary sectional view on the line 7—7 in FIG. 6 of a connection between the suspension type insulating elements, and FIG. 8 is a plan view of a cotter pin securing means shown in FIG. 7.

Electrical transmission systems for lines carrying voltages up to, say, several hundred kilovolts, have commonly employed two different means for supporting and insulating the line conductors from the supporting structures, rigid and flexible. The rigid group includes two major types: pin type and post type. Pin type insulators consist of one or more porcelain parts with projecting flanges, these parts attached together in nested relationship, if more than one, and provided with means at the top for attaching the conductor and means within the porcelain part for mounting on a pin or similar device which is attached to the cross arm. Post insulators consist, usually, of one porcelain unit with means at the upper end for attachment of the conductor, the lower end being cemented into a metal base or cup which holds the porcelain and which provides for attachment to the cross arm.

The other supporting means commonly employed have been of the suspension type construction in which a number of insulating elements are connected one above another by flexible connecting means to form a flexible or jointed string suspended from a cross arm and operating in tension, but not in compression, in supporting a line conductor. A variation of this type of construction is employed in dead end or strain resisting means at the end of and in line with the conductor.

The present invention provides a different type of construction comprising the support of a line conductor at a given point by two insulator members at least one of which is capable of resisting stresses of either compression or tension, so arranged that the conductor is maintained in a predetermined controlled position and insulating spacing from the pole or its arm or other supporting means, with the several advantages pointed out below.

Figure 1:
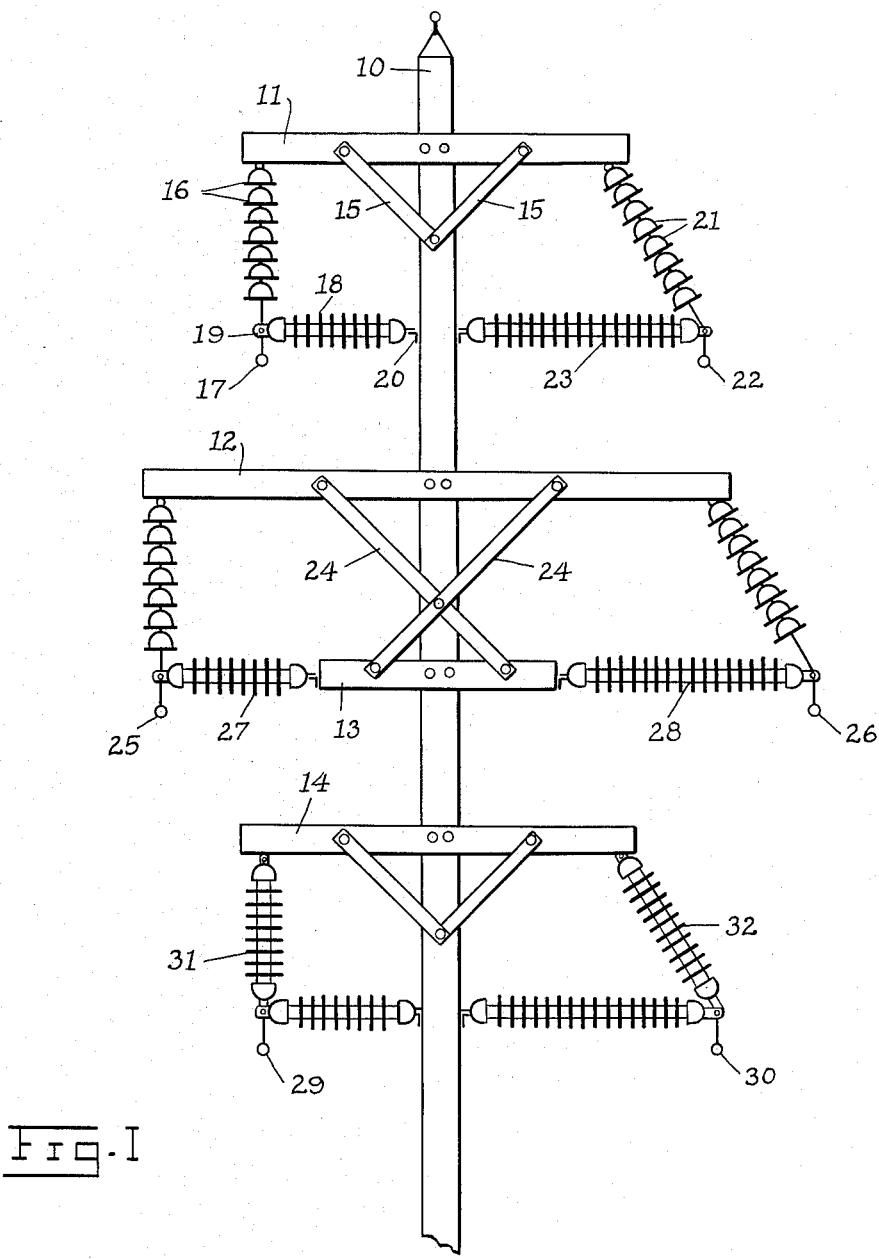
FIG. 1 is a schematic elevation of a double three phase circuit electrical transmission system supported by insulating members from cross arms on a single pole.

Referring more particularly to the drawings, FIG. 1 shows in a somewhat schematic way a double, three phase circuit system on a single pole 10 provided with cross arms 11 to 14, inclusive. The upper cross arm 11 is braced to the pole as at 15 and at one end supports a suspension type string of insulating elements 16 of the known construction referred to above, connected together by jointed or otherwise flexible means, as hereafter described in more detail. This suspension type insulating means or member is connected at its upper end to the cross arm and at its lower end to the known or suitable clamping means for attaching it to the line conductor 17, so that this insulating means operates in tension as the main provision for supporting the weight or downward pull on the conductor. Combined with this suspension type insulating means is a second insulating member 18 of substantially rigid construction capable of resisting stresses of both compression and tension, as hereafter more particularly described. One end of insulating member 18 is connected as at 19 in any known and suitable manner to the lower end of the suspension insulating means or to the conductor at substantially the same point, while the other end of member 18 is movably connected to the pole as by means of pivotal attachment to an angular clip 20, as shown, or other known and suitable attaching means. Member 18 is thus provided to act as a "strut" support for holding conductor 17 in a predetermined controlled position, against being swung substantially in side sway, relatively to the pole or adjacent structures, as by means of wind pressure, so as to maintain a predetermined insulating clearance corresponding to the voltage impressed upon the conductor.

This combination of suspension type and strut type insulators is shown in a somewhat different arrangement at the other end of cross arm 11 which carries a suspension type string of insulators 21, as described above supporting a line conductor 22. In this arrangement the strut type insulator 23 is connected with the conductor and movably connected to the pole as previously described, but is of greater length so as to maintain the conductor at a greater distance outwardly from the pole and beyond the end of the cross arm, to maintain a greater insulating clearance and provide for the use of a higher impressed voltage than might otherwise be properly impressed on the conductor. In such an arrangement the suspension type string also may be lengthened as shown at 21.

The intermediate pair of cross arms 12 and 13, braced as at 24, support conductors 25 and 26 in substantially the same arrangement as described above, except that cross arm 12 is of greater length, cross arm 13 of less length and the strut type insulators 27 and 28 have their inner end movably connected to the short cross arm 13.

The lower cross arm 14 supports the remaining conductors 29 and 30 in the arrangement described above in connection with the top cross arm 11, except that in this case the suspension type insulators are replaced by strut type insulating members 31 and 32, as may be desirable where the structure is subject to uplift on the conductor, as well understood in the art, or other condition requiring more positive positioning of the conductors.

Figure 2:
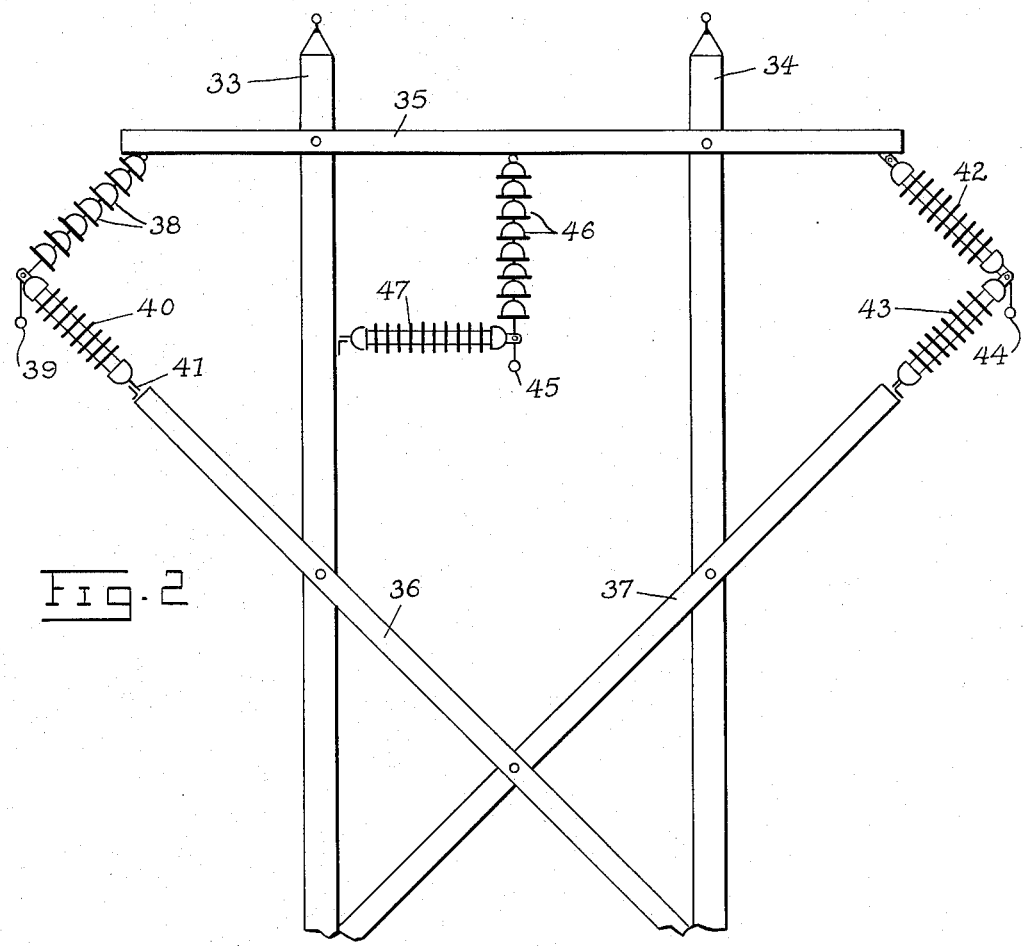
FIG. 2 is a similar view but showing a single three phase circuit supported by a cross arm on a two pole support.

A two-pole supporting system is shown in FIG. 2, where the poles 33 and 34 are connected by a cross arm 35 and by inclined cross braces 36 and 37. One end of cross arm 35 supports a suspension type string of insulating elements 38 supporting a conductor 39 to which is connected also a strut type insulator 40, such as referred to above, having its other end movably connected at 41 to the other end of brace 36. In this arrangement, the insulating members are both maintained in an outwardly inclined position, as shown, by the weight of the conductor. The other end of cross arm 35 supports a pair of strut type insulating members 42 and 43 having their outer ends connected to the conductor 44, the inner end of member 43 being movably connected to the brace 37. This arrangement provides a more positive support for the conductor than the arrangement described above at the other end of the cross arm. The third conductor 45 is supported from the center of the cross arm by a suspension type string of elements 46 and by a strut type insulator 47 connecting the conductor and the pole 33 as described above so as to prevent the swinging of the conductor toward either pole.

Figure 3:
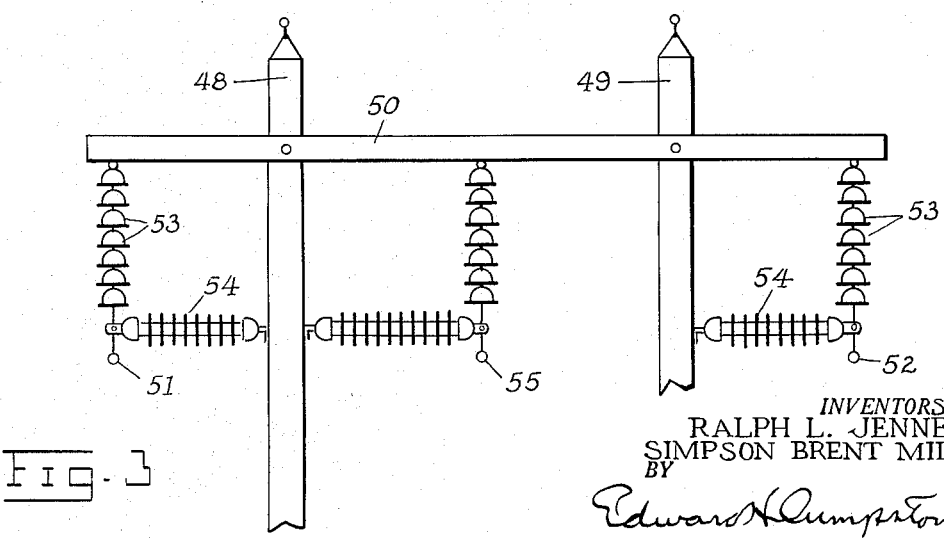
FIG. 3 is a view similar to FIG. 2, but showing a somewhat different arrangement of the insulating members and cross arm means.

A different two-pole arrangement is shown in FIG. 3 in which the two poles 48 and 49 are connected by a cross arm 50, the ends of which support the conductors 51 and 52, each by means of a suspension type string of insulating elements 53 and a strut type member 54, as described above. The third conductor 55 is supported intermediate the poles, as described above in connection with the arrangement shown in FIG. 2. In this arrangement, all of the conductors are supported by pairs of insulating members extending at right angles to each other, as shown. While the above arrangements have been described as comprising supporting poles, it is contemplated that the same arrangements are applicable where structural steel towers are employed instead of poles and provided with supporting cross arm means, as well understood in the art, the term "upright supporting means" as employed in the appended claims being employed generically as including both single elements or poles of natural or fabricated material and frame structures or towers, as well understood in the art.

A strut type insulator, as referred to above, is shown by way of illustration in FIGS. 4 and 5. The elongated insulating member 56 is preferably of one-piece porcelain construction with the usual insulating skirts 57 and metallic caps 58 and 59 secured to its ends as by means of cement 60. Each cap has an extension 61 which may be a single plate-like lug formed with an "eye" 62, or may take the form of clevis parts 63 formed with eyes for the reception of a pin 64, the member 56 being thus adapted for the attachment thereto of means for connecting one end to the usual conductor clamp and connecting the other end pivotally to the clip 20 on the supporting pole or cross arm, as described above, so as to afford a limited swinging movement of the insulator on the pole or cross arm in response to longitudinal stresses in the conductor. However, to accommodate higher ranges of voltage, two or more one-piece units such as described above may be rigidly fastened together in alignment with one another, as well understood in the art.

The suspension type string of insulating members referred to above may have the known type of construction shown in FIG. 6 in which each skirted porcelain element 65 has an undercut head 66 in which is cemented the upper end of an "eye" or ball bolt 67. The lower end of each ball bolt has a shouldered head 68 inserted through a lateral opening 69 (FIG. 7) into a socket 70 in the metal cap 71 cemented to the next lower insulating element. A cotter pin 72 is inserted through a small opposite opening 73 in the cap so as to lie under the head 68 of the bolt and prevent its inadvertent detachment, thus providing for the assembly of any desired number of insulating elements or for the replacement of any which may be disabled. The cap 74 of the upper element of the string is preferably provided with an attaching ball hook connector 75 connected to the insulator cap by a ball and socket joint such as described above, while the bolt of the lower element 65 is preferably connected by a similar ball and socket joint with an attaching eye connector 76, as shown, so that the insulator string may be attached to means for connecting its upper end to a cross arm and its lower end to the usual line conductor clamp. The described construction provides a string of insulating elements having a jointed or flexible connection with one another and adapted to support tensile stresses imposed by the weight of the line conductor. The construction of these parts illustrated in FIGS. 6 to 8, inclusive, is well known in the art and its particular details form no part of the present invention, but it is contemplated that either this or other known and suitable suspension type assemblies of insulating elements may be employed in the present combination.

A supporting and insulating system such as described affords a number of important advantages. It is readily applicable to the poles or towers of existing lines to support the line conductors against swinging out of a substantially fixed position, thereby maintaining a minimum insulating clearance from the pole or other structures and increasing the voltage which may be safely impressed upon the conductor. This advantage is obtained by the arrangement of the insulating members at right angles to each other, as in the case of the members 16 and 18 in FIG. 1, and a still greater clearance may be maintained by the arrangement represented by the members 21 and 23 in the same figure. Either arrangement involves the use of at least one strut type insulator, although both members of the pair may be of the strut type where so desired. A further advantageous use of the invention is in connection with angles in the line to support the conductor in substantially fixed position with respect to the supporting means against stresses existing as a result of angle in the line. The invention thus provides for stepping up by substantial amounts the permissible voltage on existing lines with a minimum of expense, while also decreasing the likelihood of short-circuiting of the line and the resulting damage and expense.

In application to new power line installations, the invention affords the advantages among others that, for a given voltage, the cross arm supporting means may be made shorter than where the line is free to swing on flexible suspension type strings of insulating members. The insulating members afford a limited yielding movement in response to a longitudinal pull on the conductor and a reduction in the length of the cross arms which reduces the torque force which may be imposed where a conductor is broken and left with a heavy longitudinal pull on the supporting means. Such considerations enable the use of smaller, lighter and less expensive cross arm means, while minimizing the likelihood of damage to the installation and adjacent property reducing the cost of maintenance. Furthermore, such reduction in the overall width of the system permits of the use of a right-of-way of less width and less cost, particularly in thickly populated communities where right of way is most expensive.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

This application is a continuation of our application, Serial No. 546,043, filed November 10, 1955, and now abandoned.

We claim:

1. An electrical high voltage power transmission system comprising a transmitting conductor therefor, upright supporting means spaced apart longitudinally of said conductor and each including a cross arm extending transversely of said conductor, a first elongated member of insulating material having one end connected to said cross arm and depending therefrom with its other end connected to said conductor for tensile stressing to support the weight thereof and space said conductor from said cross arm and a second elongated substantially rigid member of insulating material having a connection at one end with said conductor and extending at an angle to said first member, and means at the other end of said second member movably connecting the same to said supporting means, for stressing in both tension and compression, to restrain lateral movement of said conductor and maintain its insulating clearance, said members being movable relative to said supporting means to accommodate limited longitudinal movements of said conductor.

2. A high voltage electrical transmission system as specified in claim 1 in which said second insulating member is a rod extending substantially from said conductor to said supporting means and pivotally connected to said supporting means.

3. A high voltage electrical transmission system as specified in claim 1 in which said second insulating member is constructed of porcelain with a metal cap at one end connected to said conductor and a metal cap at its other end movably connected to said supporting means.

4. A high voltage electrical transmission system as specified in claim 1 in which said second insulating member is a rigid strut of porcelain material having a metal cap at one end connected to said conductor and a metal cap at its other end pivotally connected to said supporting means.

5. A high voltage electrical transmission system as specified in claim 1 in which said first insulating member is a flexible suspension type string of insulating elements having one end of said member connected to said conductor and its other end connected to and depending from said cross arm in tensile stressing to support the weight of said conductor.

6. A high voltage electrical transmission system as specified in claim 1 in which said first insulating member is an elongated substantially rigid element of insulating material having one end connected to said cross arm and depending therefrom with its other end connected to said conductor.

7. A high voltage electrical transmission system as specified in claim 1 in which said second insulating member is extended to position said conductor beyond the end of said cross arm.

8. A high voltage electrical transmission system as specified in claim 1 in which said first insulating member is connected substantially directly to said conductor and to said cross arm and said second insulating member is connected substantially directly to said conductor and to said supporting means.

References Cited in the file of this patent

UNITED STATES PATENTS

| | | |
|---|---|---|
| 947,885 | Cone | Feb. 1, 1910 |
| 1,160,544 | Steinberger | Nov. 16, 1915 |
| 1,326,307 | Thomas | Dec. 30, 1919 |
| 1,616,931 | Thomas | Feb. 8, 1927 |
| 1,888,534 | Jenner et al. | Nov. 22, 1932 |
| 2,587,587 | Bellezza et al. | Mar. 4, 1952 |
| 2,606,952 | Cofer et al. | Aug. 12, 1952 |

FOREIGN PATENTS

| | | |
|---|---|---|
| 384,526 | France | Feb. 6, 1908 |
| 18,101 | France | Dec. 1, 1913 |
| | (Addition to No. 460,732) | |
| 479,098 | France | Nov. 20, 1915 |
| 550,405 | Germany | May 11, 1932 |
| 843,042 | France | Mar. 20, 1939 |
| 942,676 | France | Sept. 20, 1948 |